United States Patent [19]

Aizawa et al.

[11] 3,997,093
[45] Dec. 14, 1976

[54] WEB FEED APPARATUS

[75] Inventors: Masahiro Aizawa, Tokyo; Toshiro Bando; Toshio Shiina, both of Yokohama; Nobuhito Sasaki, Tokyo; Terunobu Onuma, Miyagi, all of Japan

[73] Assignee: Ricoh Co., Ltd., Japan

[22] Filed: July 8, 1975

[21] Appl. No.: 593,972

[30] Foreign Application Priority Data

July 8, 1974 Japan .............................. 49-78075

[52] U.S. Cl. .................................. 226/11; 226/25; 226/74; 226/198

[51] Int. Cl.² .................. B65H 25/04; B65H 17/38

[58] Field of Search ................. 226/11, 25, 74, 75, 226/89, 90, 195, 198, 91, 78, 83, 77; 355/3, 14; 198/208

[56] References Cited

UNITED STATES PATENTS

| 1,882,014 | 10/1932 | Howell | 226/78 X |
|---|---|---|---|
| 3,358,555 | 12/1967 | Call | 271/274 X |
| 3,653,068 | 3/1972 | Gordon | 226/195 X |
| 3,665,844 | 5/1972 | Clark | 226/11 X |
| 3,729,123 | 4/1973 | Lloyd | 226/195 X |
| 3,800,992 | 4/1974 | Yamagishi | 226/74 X |

*Primary Examiner*—Evon C. Blunk
*Assistant Examiner*—Bruce H. Stoner, Jr.
*Attorney, Agent, or Firm*—McGlew and Tuttle

[57] ABSTRACT

The apparatus is removably mounted on a copying machine, for feeding a web, such as an output medium of a computer, as it is paid out of a web supply tray. The apparatus comprises pin chains for driving the web, a roller for reversing the direction of movement of the web driven by the pin chains, a conveyor pivotally movable between a horizontal position and a vertical position, an operating device for operating the pin chains, a discharged web receiving tray disposed beneath the web supply tray, and a window for taking readings on the scale attached to the copying machine and indicating the sizes of copy sheets.

6 Claims, 9 Drawing Figures

WEB FEED APPARATUS

BACKGROUND OF THE INVENTION

This invention relates to paper feed apparatus, and more particularly it deals with a web feed apparatus adapted for use with a copying machine which permits a web to be positively fed to a predetermined position by moving the web a distance which may vary from time to time.

When a duplicate of an original is made from a web such as an output medium of a computer, it is necessary to move a portion of the web should be duplicated to a position, in the exposing section of a copying machine, which is determined by the size of a copy sheet used. In case there is a change in the size of a copy sheet used, the distance covered by the movement of the web as it is fed should be changed accordingly.

Apparatuses for successively feeding a web are known, but difficulty has hitherto been experienced in positioning the web accurately as it is fed by feed means in apparatus of the prior art.

SUMMARY OF THE INVENTION

An object of this invention is to provide a web feed apparatus which enables moving any portion of a web, as desired, to a predetermined position.

Another object of the invention is to provide a web feed apparatus which permits a web or an original to be moved in a normal direction or a reverse direction so that any portion of the original, as desired, can be moved accurately to a predetermined position.

Another object of the invention is to provide a web feed apparatus which enables the amount of the web fed to the copying machine to be varied as desired, such apparatus being readily mounted on and removed from the copying machine and capable of automatic synchronized operation with the copying machine.

Still another object of the invention is to provide a web feed apparatus which enables directly taking readings of the sizes of copy sheets indicated on the copying machine when the apparatus is mounted on the copying machine.

Still another object of the invention is to provide a web feed apparatus comprising a web supply tray and a discharged web receiving tray detachably attached to the apparatus and one disposed above the other, the two trays being displaced from each other with respect to the direction of movement of the web fed to the copying machine thereby to avoid a tangle of a portion of the web leaving the web supply tray and a portion thereof introduced into the discharged web receiving tray.

A further object of the invention is to provide a web feed apparatus comprising a tension roller which precludes loosening of the web when it is moved, such tension roller not performing a tensioning action when the position of the tension roller is adjusted in positioning the same and being adapted to tension the web only when the latter is moved.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
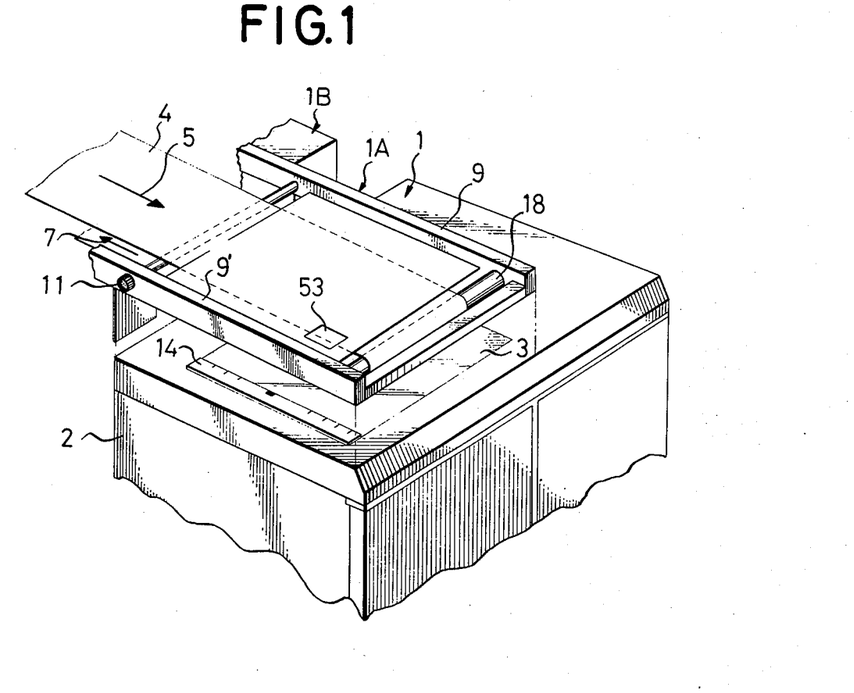
FIG. 1 is a schematic view showing the web feed apparatus according to the present invention in relation to a copying machine.

In FIG. 1, a web feed apparatus 1 is shown as being mounted on an original rest deck of a copying machine 2 in such a manner that a transparent plate 3 of the original rest deck is disposed beneath the web feed apparatus 1.

A web 4 is fed by the web feed apparatus 1 and moves through an upper path 5 to a tension roller 18 which reverses the direction of movement of the web 4 so that the latter moves through a lower path 7.

Figure 2:
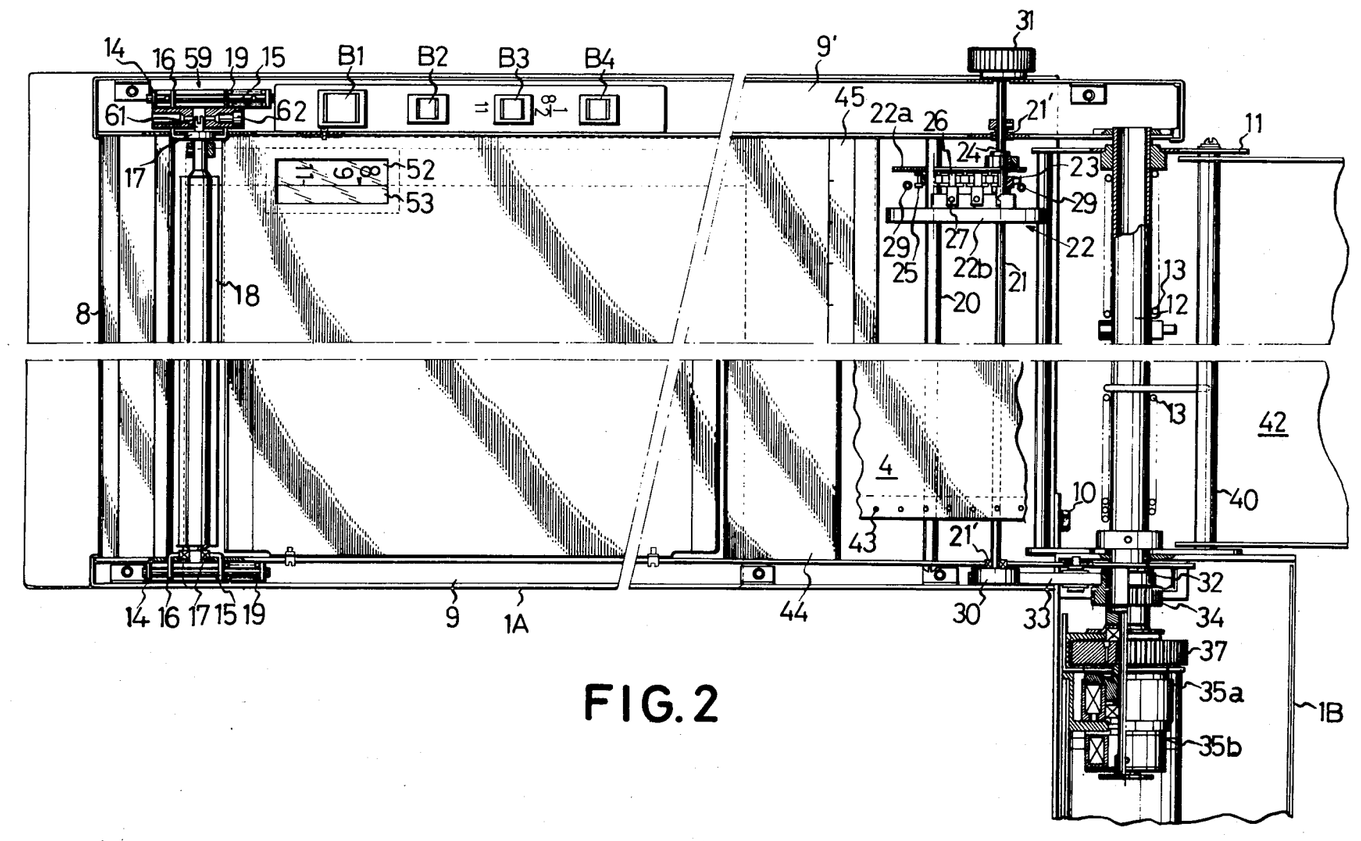
FIG. 2 is a plan view, with certain parts being shown in section, of the web feed apparatus according to the invention.
Figure 3:
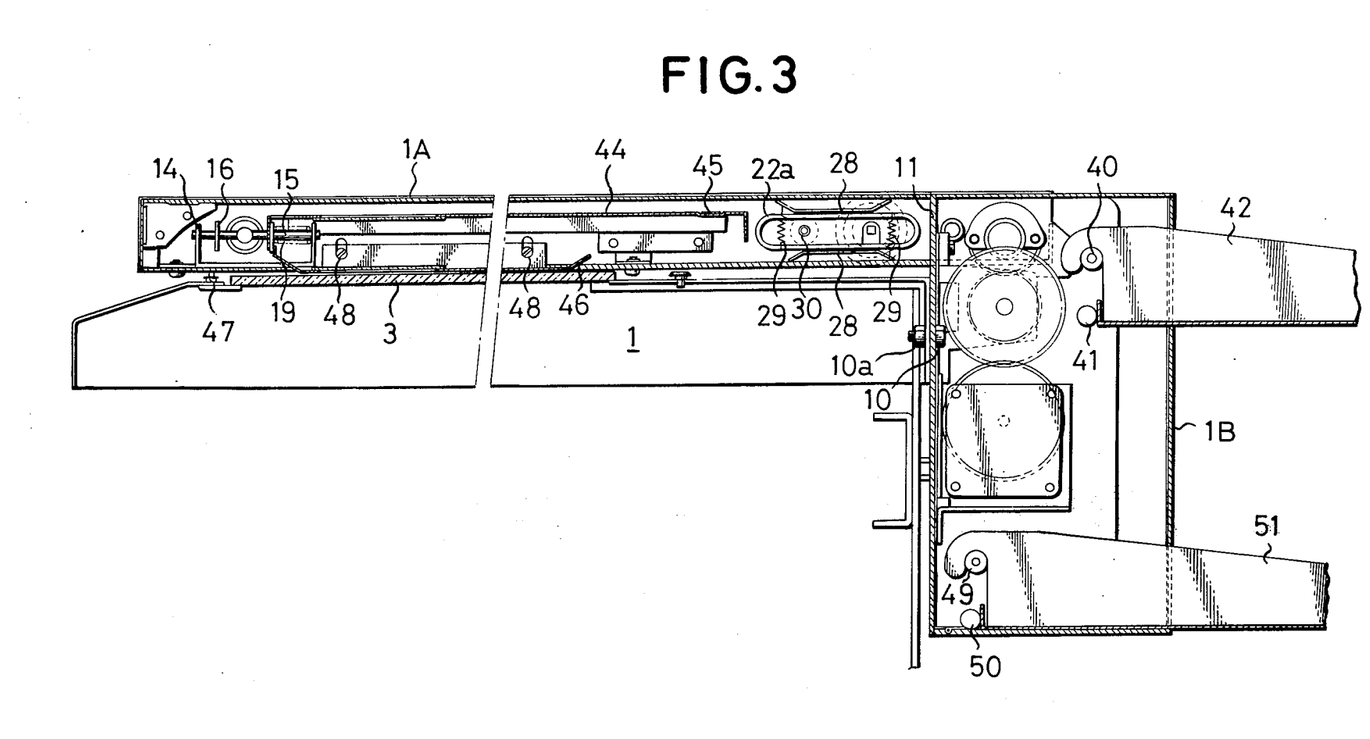
FIG. 3 is a front view, with certain parts being shown in section, of the apparatus shown in FIG. 2.

The web feed apparatus according to the invention is shown in detail in FIG. 2 and FIG. 3 and comprises a conveyor device 1A and an operating device 1B.

The conveyor device 1A comprises a conveyor frame means including frames 9 and 9' disposed in spaced parallel relationship and connected together by a connector 8 at the free end thereof. The frames 9 and 9' are pivotally supported at the other end thereof by a shaft 12 fixedly supported by a support frame 11 which can be readily connected to and disconnected from the copying machine 1 by bolts 10 and nuts 10a. Mounted on the shaft 12 are springs 13 each connected at one end to the support frame 11 and at the other end to either frame 9 or 9'. The springs 13 perform the function of lessening the force which is required to move the conveyor frame means pivotally about the shaft 12. As shown, the conveyor frame means is in an operative position. When the conveyor frame means is in this position, the biasing force of the springs 13 is lower than the force of gravity exerted on the frames 9 and 9', so that the conveyor frame means is kept from inadvertently moving upwardly due to the biasing force of the springs 13.

If an attempt is made to grip one end of the conveyor frame means by hand and move the same pivotally about shaft 12, a considerable portion of the weight of the frames 9 and 9' will be compensated by the biasing force of the springs 13, so that it is possible to pivotally move the conveyor frame means to a vertical position with a relatively low force in spite of the fact that the frames 9 and 9' are considerably heavy in weight. The biasing force of the springs 13 is set such that, when the free end of the conveyor frame means is raised to a certain angular level, the moment of rotation produced by the springs 13 is greater than the moment of rotation produced by the weight of the frames 9 and 9', with a result that thereafter the conveyor frame means is moved by the biasing force of the springs 13 to its vertical position.

A support member 14 is fixed to each of the frames 9 and 9' near the free end portions thereof. Each support member 14 has secured thereto guide rods 15 which supports brackets 16 for sliding motion.

The tension roller 18 is rotatably supported at opposite ends thereof by bearings 17 mounted on the brackets 16 which are urged by the biasing force of the tension springs 19 mounted on the guide rods 15 to move in a direction in which the web 4 is tensioned, so that the roller 18 is urged to move toward the free end of the frame means or leftwardly in FIG. 2 and FIG. 3. The biasing force F (FIG. 6) of the tension springs 19 is set up at a level such that it is lower than the force of gravity W exerted on the roller 18, brackets 19 and other mechanical parts supported by the brackets 16. From this, it will be seen that when the conveyor frame means is moved from its operative position shown in solid lines in FIG. 2 and FIG. 6 to its setting position shown in dash-and-dot lines in FIG. 6, in which the conveyor frame means is substantially vertical, the roller 18 moves slightly downwardly, so that no tension will act on the web 4 trained over the roller 18.

The frames 9 and 9' are connected together by another connector 20 in a position near the shaft 12 at which the conveyor frame means pivots. Mounted in the in the vicinity of the second connector 20 and disposed parallel thereto is a drive shaft 21 which is rotatably supported at opposite ends thereof by bearings 21' mounted on the frames 9 and 9'. Supporters 22 are mounted on the drive shaft 21 and connector 20 for sliding motion and disposed near the frames 9 and 9', the drive shaft 21 and connector 20 serving as guides for the supporters 22.

Rings 24 are slidably mounted on the drive shaft 21, the frictional dragging of the rings 24 on the drive shaft 21 being increased by springs or the like (not shown) which are also mounted on the drive shaft 21. Each ring 24 has secured thereto a sprocket 23, so that each ring 24 or sprocket 23 does not readily move relative to the drive shaft 21 when subjected to mechanical vibration or the like, unless forcedly moved by hand.

Chain rings 25 are rotatably and slidably mounted on the connector 20, and a chain 26 is trained about each chain ring 25 and the associated sprocket 23. Each chain 26 has pins 27 spaced apart from one another a predetermined distance and attached to a side plate thereof. The pin chains 26 are positioned such that the transparent plate or exposing surface 3 of the copying machine is disposed beneath a portion of the conveyor frame means which is interposed between the tension roller 18 and the pin chains 26.

Each supporter 22 consists of a support bar 22a and a guide plate 22b connected together as a unit. Keep plates 28 are hingedly connected to each support bar 22a and can move pivotally between a holding position, in which they keep the web 4 in engagement with the pins 27 to preclude dislodging of the web 4 from the pins 27, and a release position, in which the keep plates are released from engagement with the web 4 to allow removal of the web from the pins 27. When in the holding position, each keep plate 28 is forced against the support plate 22a by springs 29 of low resilience so as to hold the web 4 between the keep plate 28 and the guide plate 22b. Each keep plate 28 is formed with slots for the pins 27 to extend therethrough.

As can be seen in FIG. 3, each pin chain 26 has two keep plates 28 hingedly connected to the support plate 22a such that one is disposed above and the other is disposed below the pin chain, so as to force the web against the pins 27 of the pin chain 26 from above, in the upper run of the web which is fed to the copying machine, and to force the web against the pins 27 of the pin chain 26 from below, in the lower run of the web which is discharged from the copying machine.

The drive shaft 21, on which the sprockets 23 are mounted supports at one end thereof a pulley or, sprocket, or, the like 30 and, at the other end thereof a know 31. A belt 33 is trained about the pulley 30 and about a drive pulley 32 of the operating device 1B secured to the support frame 11.

Figure 4:
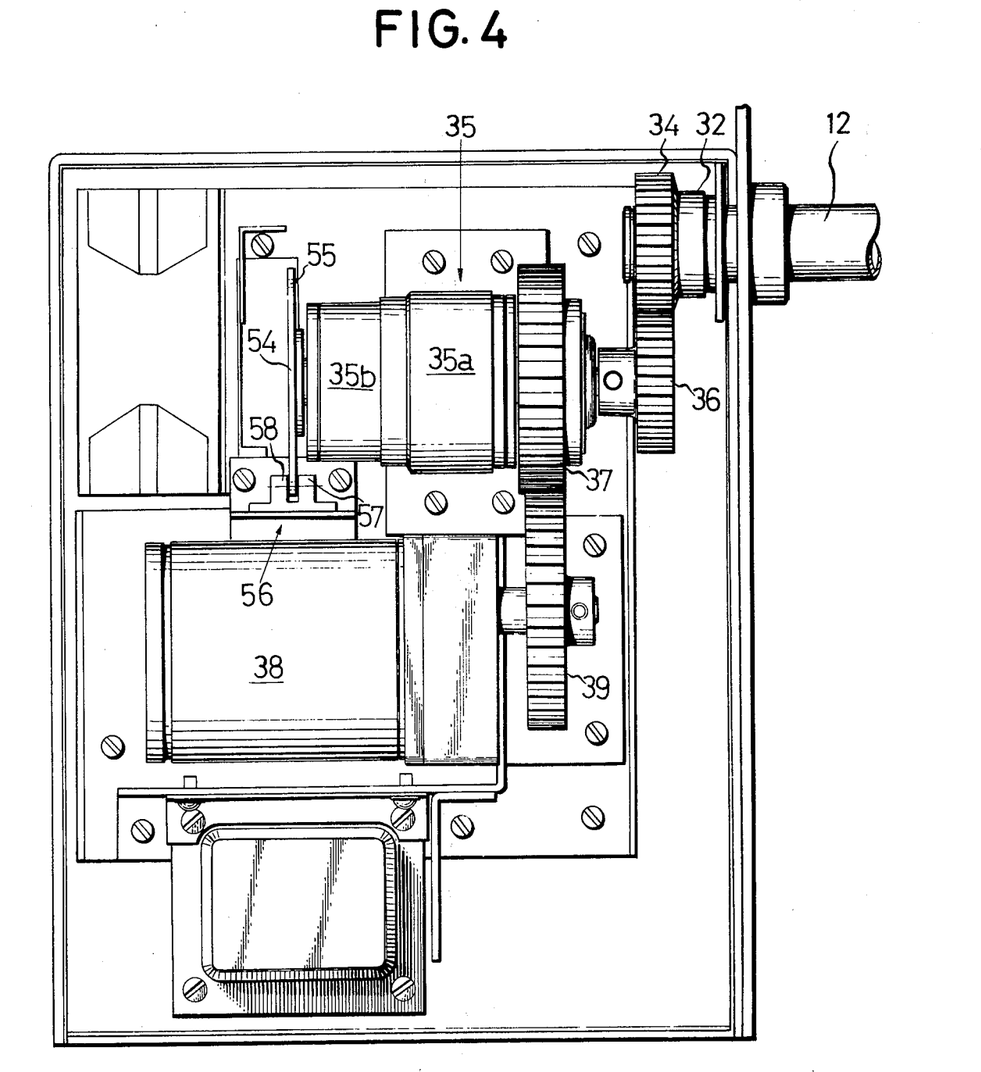
FIG. 4 is a plan view of the operating device of the web feed apparatus according to the invention.
Figure 5:
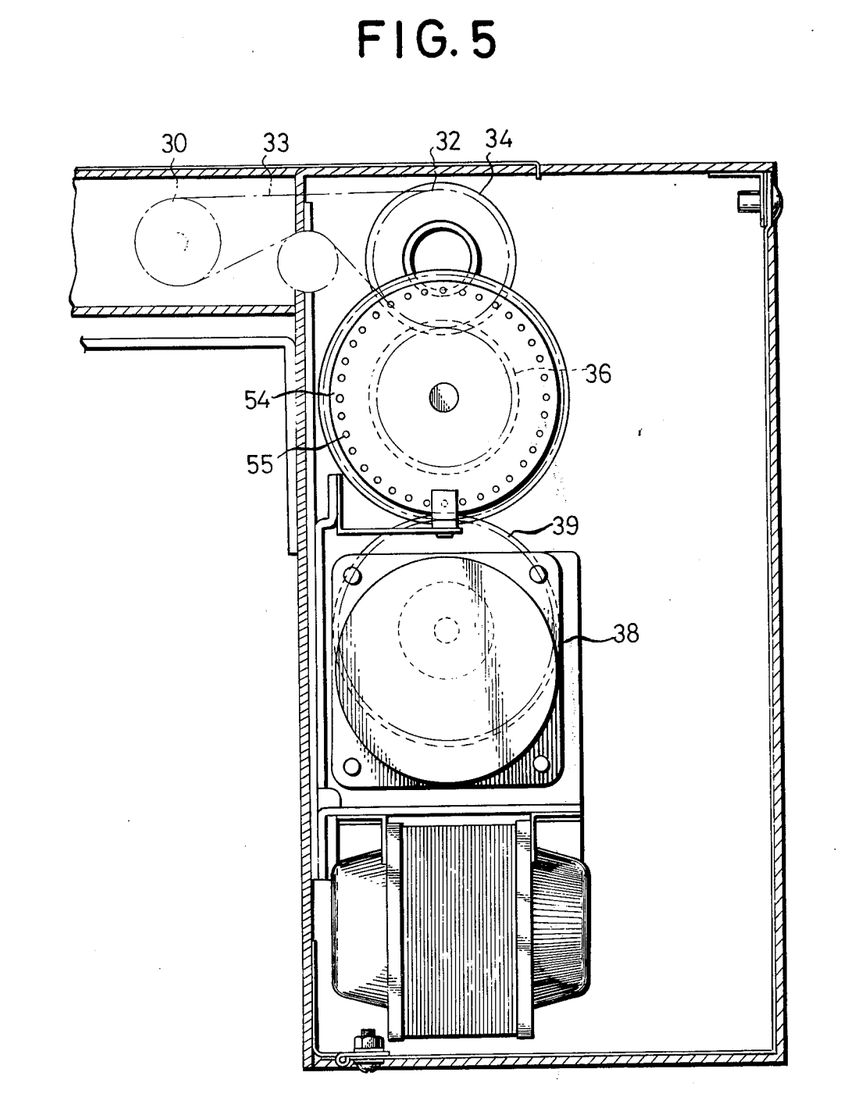
FIG. 5 is a side view of the operating device shown in FIG. 4.

Referring to FIG. 4 and FIG. 5, the drive pulley 32 is rotatably supported by the shaft 12 secured to the support frame 11. A gear 34 is formed integrally with the drive pulley 32 and maintained in meshing engagement with a gear 36 secured to an output shaft of a clutch brake means 35 which has secured to its input shaft a gear 37 maintained in meshing engagement with a gear 39 secured to an output shaft of a motor 38.

Upon actuation of a clutch 35a of the clutch brake means 35, the pulley 30 is rotated through the gears 39, 37, 36 and 34 and belt 33. Rotation of pulley 30 drives the drive shaft 21 which causes the sprockets 23 to rotate, thereby actuating the pin chains 26. If the clutch 35a is de-actuated and a brake 35b is actuated, then the input shaft of the clutch brake means 35 rotates but its output shaft remains stationary. Thus the sprockets 23 stop rotating and the pin chains 26 are deactuated.

In feeding the web 4 to the copying machine, a leading end portion of the web 4 is paid out of a web supply tray 42 hooked to a rod 40 attached to the support frame 11 and held in position by a stopper 41. The web 4 is formed in its side marginal portions with rows of holes 43 disposed longitudinally of the web 4 and which receive therein the pins 27 of the pin chains 26. Then the keep plates 28 force the web 4 against the guide plates 22b. The knob 31 is turned manually or by means of the motor 38 after actuating the clutch 35a of the clutch brake means 35, so that the web 4 can be moved forwardly a predetermined distance. Thereafter the movement of the web 4 is stopped and the conveyor frame means is pivoted to its substantially vertical position.

The web 4, which is engaged in a selected position by the pin chains 26 whose pins are inserted in the holes 43 in the web 4, is trained at its free end portion over the tension roller 18 and fed rearwardly along the underside of the conveyor frame means. The pins 27 of the pin chains 26 opposite in position to the pins 27 inserted in the holes 43 in the web as aforesaid are inserted in the holes 43, and the web 4 is pressed against the guide plates 22b by keep plates 28. Thus each side marginal portion of the web 4 is engaged by the opposing portions of one pin chain 26. Stated differently, the web 4 is engaged by the pin chains 26 at least at two points, with the tension roller 18 being disposed between the upper run and the lower run of the web, so that the web 4 can be forcedly moved by the pin chains 26 at two points. The setting operation is completed when the pins 27 of the pin chains 26 are inserted in the holes 43 in the web 4 at opposite sides of the pin chains 26 and the web 4 is held in position by the keep plates 28. Then the conveyor frame means is returned to its horizontal or operative position.

Actuation of the operating device 1B intermittently moves the web in a predetermined direction, so that copying is carried out by the copying machine 1. When there is a variation in the width of the web 4 or the distance between the rows of holes 43 in the side marginal portions of the web 4, adjustments of width can be effected by moving the supporters 22 along the drive shaft 21 and connector 20. The two supporters 22 may be moved. However, the adjusting operation can be facilitated if the supporter 22 nearer to the knob 31 in FIG. 2 is fixed while the supporter 22 nearer to the pulley 30 is moved.

In order to facilitate adjustments of the width of the web 4, a scale 45 is mounted on a guide 44 attached to the frame 9 for guiding the web in its movement between the pin chains 26 and roller 18.

An exposing guide plate 46 is mounted on the conveyor frame 9 so as to feed the web 4 in such a manner that it is substantially in contact with the transparent plate or exposing glass 3 after the web 4 is trained over the roller 18. As shown in FIG. 3, the position of the exposing guide plate 46 can be readily adjusted by means of screws 48 so as to bring the same to an optimal position when the conveyor frame means is positioned with respect to the copying machine 1 by means of shaft 12 and feet 47 attached to the conveyor frames 9 and 9'.

The portion of the web 4 which is intermittently discharged after completion of copying is piled in a stack on a discharged web receiving tray 51 after being released from engagement with the pin chains 26 at their lower portions. The discharged web receiving tray 51 is hooked to a rod 49 attached to the support frame 11 and held in position by a stopper 50.

The web supply tray 42 and discharged web receiving tray 51 are disposed one above the other. The two trays 42 and 51 are displaced from each other relative to the direction of movement of the web in such a manner that, when the conveyor frame means is in its setting position in which it is substantially vertically disposed, the web feed surface of the conveyor frame means is indexed with the end portion of the web 4 in the supply tray 42 and the web discharge surface of the conveyor frame means is indexed with the web receiving end of the tray 51. Stated differently, the two trays are displaced from each other a distance which substantially corresponds to the diameter of the roller 18, the thickness of the conveyor frames 9, 9', or the spacing between the upper and lower surfaces of the pin chains 26, so that the opposite end portions of the web which is trained over the tension roller 18 when the conveyor frame means is in its setting position are indexed with the end portion of the web supply tray 42 and the end portion of the discharged web receiving tray 51, respectively. By this arrangement, setting of the web is facilitated. In the foregoing description, the web setting operation has been described as being performed such that the web is first brought into engagement with the upper surface of each pin chain and held in position by the keep plates and then the conveyor frame means is moved into its setting or vertical position. Alternatively, the web setting operation can be performed by first bringing the conveyor frame means to its setting position, then training the web 4 over the roller 18, and finally setting the web at opposite surfaces of the pin chains 26.

Figure 6:
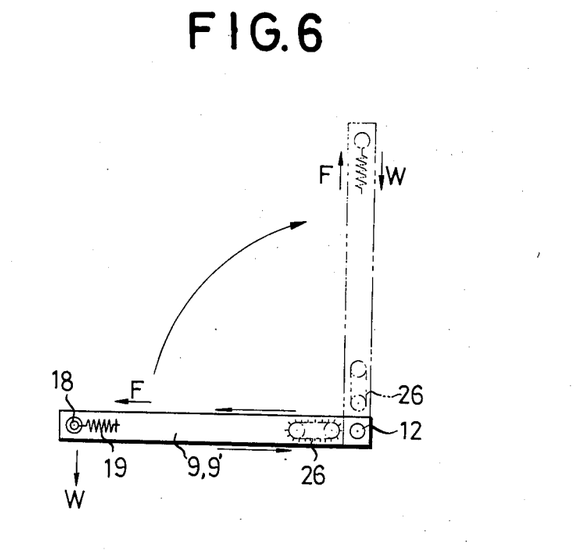
FIG. 6 is a schematic side view of the conveyor frame means in its operative position and its setting position.

When the conveyor frame means is in its setting position, the tension roller 18 is disposed in its lower position because the force of gravity W exerted thereon overcomes the biasing force F of the tension springs 19. This allows the pin 27 of the pin chains 26 to be inserted in the holes 43 in the web 4 to set the latter while the web is not tensioned. However, when the conveyor frame means is brought to its operative or horizontal position, the tension roller 18 is moved forwardly toward the free end of the conveyor frame means by the biasing force of the tension springs 19 while the opposite ends of the web are fixed. Thus the web 4 is under a predetermined tension at all times when the conveyor frame means is in its operative position, so that the web is kept taut at all times when it is fed to the copying machine.

After the web 4 is set and before a copying operation is initiated, fine adjustments are effected by turning the knob 31 so that the position of a joint of the web 4 or other boundary may be brought to a predetermined position according to a coying sheet size adjusting scale 52 mounted on the copying machine 1.

Scale windows 53 are formed in web guide plates 44 and 46 to enable the operator to see therethrough the copying sheet size adjusting scale 52 mounted on the copying machine, thereby eliminating the need to mount another scale on the web feed apparatus. The scale windows 53 are each provided with a transparent sheet of glass or plastics. Since the transparent sheets of the windows 53 and the scale 52 are spaced apart from each other, difficulty may be experienced in taking correct readings because of a dark field of view. In order to enable the operator to take correct readings on the scale 52, illuminating means may be conveniently provided between the upper and lower scale windows 53. If means is provided in the copying machine 1 for illuminating the scale 52, taking of accurate readings can be further facilitated.

In positioning the web 4, the web is brought into engagement with the pin chains 26, trained over the tension roller 18 and brought into engagement with pin chains 26 again. Then the scale 52 on the copying machine 1 is watched from above through the scale windows 53. Then the knob 31 is turned to move the web 4 so that a reference line (such as a series of perforations punched on the web) of the web 4 can be brought to a predetermined position (8 ½ or 11 inches on the scale) at which the web is to be set. Thus initial setting of the web is finished and the web can be subsequently moved automatically so as to produce a duplicate of one page after another.

In performing a copying operation, a power source button B1 (See FIG. 2) is actuated, and the size of the copy sheet is set by depressing a copy sheet size setting button B3 mounted on the conveyor frame 9'. In FIG. 2, there is shown an example in which the size of the copy sheets can be switched between 8 ½ and 11 in inches. A button B2 is depressed to set the direction of movement of the web, and a duplicate number setting button B4 is used to determine whether only one duplicate is to be made or a plurality of duplicates are to be made.

Then a copying button of the copying machine 1 is actuated to make a predetermined number of duplicates. Upon completion of the copying operation, the clutch brake means 35 is automatically actuated to move the web 4. The web 4 automatically stops moving after it is moved a distance corresponding to the size set by the copy sheet size setting button B3.

Control of the amount of the web to be fed or the distance to be covered by the movement of the web is effected by controlling the number of revolutions of the drive shaft 21. In the embodiment shown and described, the output shaft of the clutch brake means 35 mounts, as shown in FIG. 5, a light intercepting disk 54 which is formed with a series of openings 55 disposed equidistantly from one another and arranged circularly in its outer marginal portion, the openings being spaced from one another a very small distance. A pulse generator 56, shown in FIG. 4, is arranged such that each opening formed in the light intercepting disk 54 may be aligned with the path of light. The pulse generator 56 has a light emitter 57 and a light receiver 58 built therein and is effective to detect the interruption and transmission of light from the light emitter 57 to the light receiver 58 so as to supply a pulse signal to a control means (not shown).

The relation between the amount of the web to be fed, or the distance to be covered by the movement of the web and the angle of rotation of the light intercepting disk 54, or the numer of pulses, is set beforehand. Thus, if the output shaft rotates and the pulses produced reach the number which corresponds to the size of the copy sheet to which the apparatus is set, then the control means is actuated to turn off the clutch 35a and turn on the brake 35b, so that the web almost instantaneously stops in a predetermined position.

With the web stopping in the predetermined position, the copying machine 1 is automatically rendered operative to carry out copying. The aforementioned steps are repeated thereafter.

The web feed apparatus according to the present invention is constructed such that it can be removably mounted on a copying machine structurally and at the same time it can be electrically connected thereto and disconnected therefrom. When they are connected electrically, a large number of duplicates can be produced automatically by operating the buttons of the feed apparatus and the copying machine.

Figure 7:
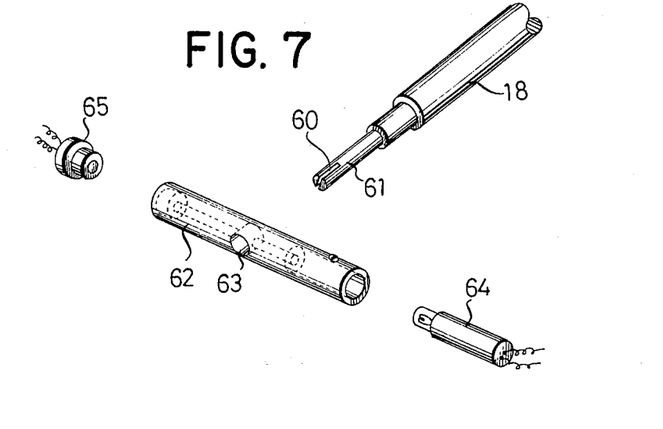
FIG. 7 is an exploded perspective view of the roller rotation detection means.
Figure 8:
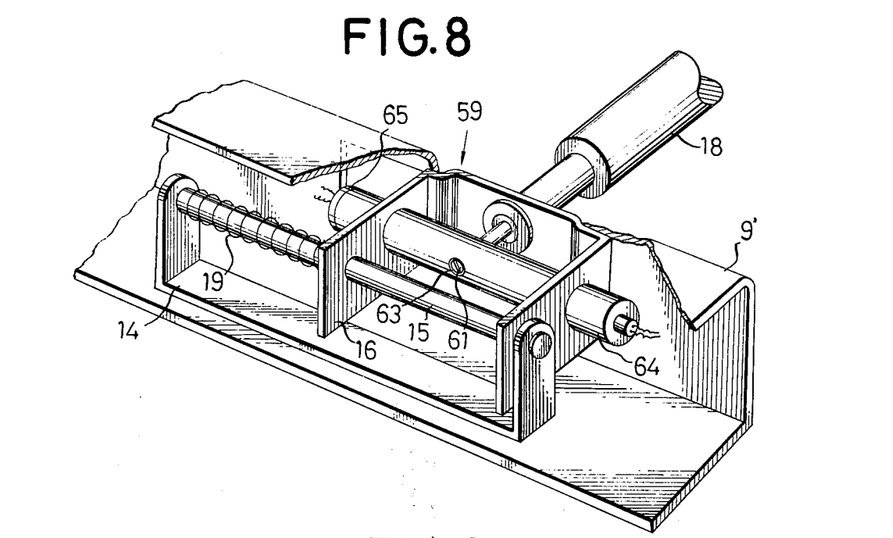
FIG. 8 shows the roller rotation detection means in an assembled position.

The web feed apparatus is electrically connected to the copying machine such that, in the event jamming of the photosensitive sheets takes place in the latter, the feeding of the web in the former is automatically stopped. A rotation detection means 59 is provided in the tension roller 18 so as to render the web feed apparatus inoperative in the event the web has run out or jamming of the web occurs. The rotation detection means 59 includes a light intercepting member 61 formed at its forward end portion with a slit 60 or an opening and provided in the bore of the roller 18, as shown in FIG. 7 and FIG. 8. The light intercepting member 61 is adapted to be inserted in a port disposed normal to the longitudinal axis of a hollow cylindrical detector member 62 which has mounted, at opposite ends of its longitudinal bore, a light emitter element 64, such as a lamp-lens combination, and a light receiving element 65, such as a cadmium sulfide meter. The light intercepting member 61 is arranged such that it extends across the path of light from the light emitter element 64 to the light receiving element 65.

While the roller 18 is rotating, the light from the light emitter element 64 is incident on the light receiving element 65 only when the slit 60 is indexed with the path of light. Thus rotation of the roller 18 produces a pulse signal which can be detected an an electrical signal. Production of the pulse signal is interrupted when the roller 18 stops rotating due to jamming of the copy sheets or running out of the web. It is thus possible to detect such accident from interruption of rotation of the roller 18.

Figure 9:
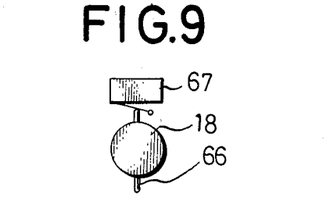
FIG. 9 is a view in explanation of another form of roller rotation detection means.

The rotation detection means shown in FIG. 7 and FIG. 8 relies on optical means for detecting rotation of the roller 18. It is to be understood, however, that the invention is not limited to such optical detecting means. FIG. 9 shows another form of rotation detection means in which a pin or other mechanical part or a magnet, not shown, is mounted as an energizing element 66 at one end portion of the tension roller 18 and a microswitch or reed switch is mounted as a detector element 67 which is positioned against the energizing element 66. Thus, upon rotation of the roller 18, the detector element 67 can be intermittently actuated by the energizing element 66 so as to produce a pulse signal.

From the foregoing description, it will be appreciated that, according to the present invention, the wed paid out of the web supply tray is forcedly moved by the pin chains, trained over the tension roller to reverse its direction of movement and moved along the exposing surface of the copying machine, and then forcedly moved by the pin chains again. By this arrangement, the web can be forcedly moved at two points, so that the web can be moved positively in either the normal or the reverse direction without producing loosening in any portion of the web which is to be juxtaposed against the exposing surface 3 of the copying machine. This allows copying to be carried out satisfactorily.

Another advantage offered by the invention is that the conveyor frame means can be pivoted about its support shaft between a horizontal position and a vertical position, thereby facilitating setting of the web.

According to the invention, the web can be kept taut while being fed. As aforesaid, the conveyor frame means can be readily switched, by merely pivoting the same, between a position in which no tension acts on the web as the web is set and a position in which tension acts on the web to keep the same taut as the web is fed. Moreover, rotation of the tension roller can be detected as a pulse signal by which it is possible to readily and positively detect any abnormal condition of the apparatus or completion of a web feeding operation.

Even in cases where copying of one portion after another of the web is carried out intermittently with the pin chains operating synchronously with the copying machine, the web automatically drops onto the discharged web receiving tray without being interfered with by the web supply tray, by virtue of the feature that the web supply tray is displaced outwardly of the discharged web receiving tray.

The web supply tray and discharged web receiving trays are merely disengageably hooked to the web feed apparatus according to the invention. These two trays can be removed from the web feed apparatus when no copying operation is carried out. Thus, the web supply tray and discharged web receiving tray do not interfere with the operation of the web feed apparatus and do not take more space than is necessary.

What we claim is:

1. A web feed apparatus for moving a web along a path of movement from a web supply position and reversing the direction of movement of the web along the path so that the web may pass through a position in which the web is subjected to a processing operation before being discharged from the apparatus adjacent the web supply position, said web feed apparatus comprising, in combination, a support frame constructed and arranged for removable mounting on a processing machine such as a copying machine; a conveyor frame means pivotally supported at one end on said support frame for pivoting between a substantially upright web setting position and a substantially horizontal operative position; said conveyor frame means providing said path of movement of the web; a web driving means mounted on said conveyor frame means adjacent said one end thereof; a tension roller on said conveyor frame means adjacent the opposite free end thereof, for tensioning the web and reversing the direction of its movement along the path of movement when the conveyor frame means is in its operative position; said web driving means and said tension roller being disposed on respective opposite sides of the position in which the web is subjected to processing; brackets rotatably supporting said tension roller and mounted on said conveyor frame for sliding movement longitudinally of said conveyor frame; and spring means biasing said tension roller longitudinally along said conveyor frame means in a direction to tension the web; the biasing force of said spring means being less than the force of gravity exerted on said tension roller whereby, when said conveyor frame means is in its web setting position, the force of gravity is effective on said roller and said brackets to decrease the tension on the web.

2. A web feed apparatus, as claimed in claim 1, in which said web driving means comprising pin chains including equidistantly spaced pins projecting outwardly therefrom and engageable in holes formed in the web; and keep plates, mounted for movement between an open position and a closed position, and engageable with the web to maintain the web engaged with said pins.

3. A web feed apparatus, as claimed in claim 2, in which said pin chains are endless chains travelling along two spaced parallel runs to engage the web at both the web feed run of the web and the web return run of the web.

4. A web feed apparatus, as claimed in claim 3, including a drive shaft connected to said pin chains to drive the latter; manually operable means operable to rotate said drive shaft to adjust said pin chains; a driving motor; a driving connection between said driving motor and said drive shaft; said driving connection including a clutch and a brake which are alternately actuable so that, when said clutch is actuated, said drive shaft is driven and, when said brake is actuated, said drive shaft is arrested; and pulse generating means included in said driving connection and operable in accordance with rotation of said drive shaft to count the number of rotations of said drive shaft to control the feed of the web.

5. A web feed apparatus, as claimed in claim 4, including a rotation detection means operatively associated with said tension roller and operable, responsive to interruption of rotation of said tension roller due to run-out or jamming of the web, to render the web feed apparatus inoperative.

6. A web feed apparatus comprising, in combination, a tension roller; conveyor frame means rotatably supporting said tension roller for shifting thereof longitudinally of said conveyor frame means, said conveyor frame means forming a path of movement for a web trained over said tension roller to reverse the direction of movement of the web; spring means biasing said tension roller longitudinally along said conveyor frame means in a direction to tension the web; the biasing force of said spring means being less than the force of gravity exerted on said tension roller; pivot means supporting one end of said conveyor frame means for pivoting of said conveyor frame means between a substantially horizontal operative position and a substantially vertical web setting position; said tension roller being mounted on said conveyor frame means adjacent the opposite free end of said conveyor frame means whereby, in the web setting position of said conveyor frame means, said tension roller is subjected to the force of gravity to move in a direction opposite to the direction in which said tension roller is biased by said springs means, whereby to decrease the tension on the web.

* * * * *